US008024655B2

(12) United States Patent
Martin et al.

(10) Patent No.: US 8,024,655 B2
(45) Date of Patent: Sep. 20, 2011

(54) COMPRESSING PAGE DESCRIPTIONS WHILE PRESERVING HIGH QUALITY

(75) Inventors: Michael Anthony Martin, Artarmon (AU); Nathan Wong, Kensington (AU)

(73) Assignee: Canon Kabushiki Kaisha, Tokyo (JP)

( * ) Notice: Subject to any disclaimer, the term of this patent is extended or adjusted under 35 U.S.C. 154(b) by 1175 days.

(21) Appl. No.: 11/743,367

(22) Filed: May 2, 2007

(65) Prior Publication Data

US 2007/0271288 A1 Nov. 22, 2007

(30) Foreign Application Priority Data

May 3, 2006 (AU) ................................ 2006201851

(51) Int. Cl.
*G06F 3/12* (2006.01)
(52) U.S. Cl. ..................... 715/276; 715/273; 715/200
(58) Field of Classification Search .................. 715/200, 715/273, 276
See application file for complete search history.

(56) References Cited

U.S. PATENT DOCUMENTS

| | | | | | |
|---|---|---|---|---|---|
| 5,550,928 | A | * | 8/1996 | Lu et al. | 382/116 |
| 5,669,006 | A | * | 9/1997 | Joskowicz et al. | 715/202 |
| 5,673,401 | A | * | 9/1997 | Volk et al. | 725/139 |
| 5,738,522 | A | * | 4/1998 | Sussholz et al. | 434/22 |
| 5,926,185 | A | * | 7/1999 | Vyncke et al. | 345/619 |
| 5,991,515 | A | * | 11/1999 | Fall et al. | 358/1.15 |
| 6,049,390 | A | * | 4/2000 | Notredame et al. | 358/1.15 |
| 6,215,516 | B1 | * | 4/2001 | Ma et al. | 348/43 |
| 6,268,855 | B1 | * | 7/2001 | Mairs et al. | 715/784 |
| 6,583,890 | B1 | | 6/2003 | Mastie et al. | 358/1.18 |
| 2003/0200507 | A1 | * | 10/2003 | Stern et al. | 715/517 |
| 2005/0076295 | A1 | * | 4/2005 | Simske et al. | 715/517 |
| 2005/0213117 | A1 | * | 9/2005 | Clark et al. | 358/1.1 |
| 2005/0213119 | A1 | * | 9/2005 | Clark et al. | 358/1.2 |
| 2006/0117268 | A1 | * | 6/2006 | Talley et al. | 715/769 |
| 2006/0146362 | A1 | * | 7/2006 | Romney | 358/1.15 |
| 2006/0177151 | A1 | * | 8/2006 | Miyazawa et al. | 382/298 |
| 2007/0002391 | A1 | * | 1/2007 | Nagarajan et al. | 358/426.07 |
| 2009/0185222 | A1 | * | 7/2009 | Foehr et al. | 358/1.15 |
| 2009/0217187 | A1 | * | 8/2009 | Kendall et al. | 715/765 |
| 2010/0064211 | A1 | * | 3/2010 | Kujirai et al. | 715/274 |

OTHER PUBLICATIONS

Patrice Y. Simard, Henrique S. Malvar, James Rinker, Erin Renshaw. "A Foreground/Background Separation Algorithm for Image Compression. Microsoft Research" In Proceeding of Data Compression Conference, IEEE Computer Society, Los Alamitos, 2004, IEEE, pp. 498-507.*

* cited by examiner

*Primary Examiner* — Adam M Queler
*Assistant Examiner* — Michael Scott
(74) *Attorney, Agent, or Firm* — Fitzpatrick, Cella, Harper & Scinto

(57) ABSTRACT

A method (100) is disclosed for generating a page description from a list of items (201 to 204) to be rendered to the page. At least one of the items in the list belongs to a class of key items (201). Such key items may for example be text items. The method (100) traverses (601) the list, and classifies items (202, 203) not designated as key items that would when rendered overlie at least one key item (201). At least one other non-key item is then rendered to image data (104, 105), and the page description is generated (107) from page description commands which describe the key items (201), page description commands describing the classified items (202, 203), and rendered image data of the remaining items (200). Including certain items (201, 202 and 203) in the page description using page description commands ensures that the quality of such items is retained. Also, including the remainder of the items (200) using image data provides for high compression.

14 Claims, 16 Drawing Sheets

COMPRESSING PAGE DESCRIPTIONS WHILE PRESERVING HIGH QUALITY

CROSS-REFERENCE TO RELATED PATENT APPLICATION

This application claims the right of priority under 35 U.S.C. §119 based on Australian Patent Application No. 2006201851, filed 3 May 2006, which is incorporated by reference herein in its entirety as if fully set forth herein.

FIELD OF INVENTION

The current invention relates generally to page description compression and, in particular, to a method of classifying page description items to achieve high compression whilst preserving high quality.

BACKGROUND

A Page Description Language (PDL) is a language that describes the contents of a document at a higher level than an actual output bitmap. A PDL script defines page items, or graphical objects, independently of render technology, such as printers or display devices, so that a document's appearance is consistent regardless of the specific render device used. Graphical objects may include lines, rectangles, arcs, images and text. Examples of PDLs include Adobe® PostScript®, PDF (Portable Document Format), and Hewlett Packard® PCL (Printer Control Language).

PDL compression is commonly achieved by decimating images and processing PDL commands to remove redundant colors, useless clips, degenerate strokes and unused objects. For example, Adobe® Acrobat® Professional's PDF Optimizer compresses PDF by:

Downsampling color and grayscale images using JPEG, ZIP, run length, JBIG2, or CCITT compression;
Unembedding fonts;
Flattening transparency;
Discarding unused objects;
Converting smooth lines to curves;
Detecting and merging image fragments;
Using Flate to compress uncompressed streams;
Removing invalid bookmarks and links; and
Removing unreferenced named destinations.

The application PDF Compress by VeryPDF Inc. is another software application that compresses PDF files in a similar way, by:

Applying JPEG2000, JPEG, or Flate compression for color images;
Applying CCITT Group4, or Flate compression for grayscale images; and
Removing unused objects.

On-line catalogues that are designed in products such as QuarkXpress® or Adobe® Illustrator® are often of the order of 1 MB per page. This size is prohibitive for display of catalogues on websites. The compression applications described above do not achieve sufficient compression. A more aggressive algorithm is required to generate files of a size suitable for web download, which also preserves the quality of certain graphical objects, referred to as key items.

Text is an example of a class of key items. The previous methods mentioned above do not sufficiently preserve the following text attributes:

Visual appearance: Is the text crisp and clear to read?
Readability: Are text kerning, leading and word spacing preserved?
Searchability: Is the text searchable in viewer applications?
Scalability: Is the visual appearance of the text retained with zooming into and out of the text?
Extractability: Is the text extractable from the document, while retaining all its attributes?

Other classes of key items include PDF graphical objects that are intended to represent real-world objects. Users of computer aided design (CAD) documents which include such objects often require information about the scale and units of measurement of the corresponding real-world objects and their relationship to units in PDF user space. The extractability of measurement information from these PDF graphical objects must be preserved by the compression method. This information enables users of viewer applications to perform measurements that yield results in the units intended by the creator of the original document.

SUMMARY OF THE INVENTION

According to a first aspect of the present invention, there is provided a method of generating a compressed page description from a list of items to be rendered to a page, at least one of said items belonging to a class of key items, said method comprising the steps of:

classifying one or more non-key items which would overlie at least one said key item when rendered to said page;
rendering to image data at least one other non-key item; and
generating said compressed page description, comprising:
page description commands describing said at least one key item;
page description commands describing at least one said classified non-key item; and
said rendered image data of said at least one other non-key item.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which.

DETAILED DESCRIPTION

A method is described herein which generates, for a given input PDL script, a highly compressed output PDL script, whilst preserving the quality attributes of certain key graphical objects, referred to as key items. The method operates primarily by rendering some graphical objects in the PDL script to pixels and outputting those objects in compressed form as compressed images at different quality levels, while the remaining graphical objects are output using the equivalent native PDL commands.

A native PDL command is the PDL syntax that directly corresponds to the type of a graphical object. For example, text is output using native PDL commands by using the PDL syntax to show text, instead of rendering the text into an image or generating vector data.

The graphical objects selected for output using native PDL commands are typically objects for which the object's original properties, such as scale, visual appearance, searchability, and extractability, are to be retained. Such objects are designated as being key items, a designation which may also include any object that a user designates as being a key item. One type of graphical object typically designated as being key items is text on a page, referred to as a text item.

In a naïve implementation, all non-key items are rendered into a heavily compressed, low resolution image, referred to as the background image. Key items are rendered into a compressed, higher resolution image, referred to as the foreground image. Any non-key items overlying the key items are also rendered into the foreground image (see below for a definition of "overlying").

However, the result of rendering key items to pixels is an unacceptable loss of visual quality, readability, searchability, scalability and extractability in the compressed PDL script.

Disclosed herein is an improved method of selecting items for rendering into the low-quality background image, items to render into the higher-quality foreground image, and items to output using native commands, with the aim of preserving the quality of key items in terms of visual appearance, searchability, scalability and extractability.

Figure 1:
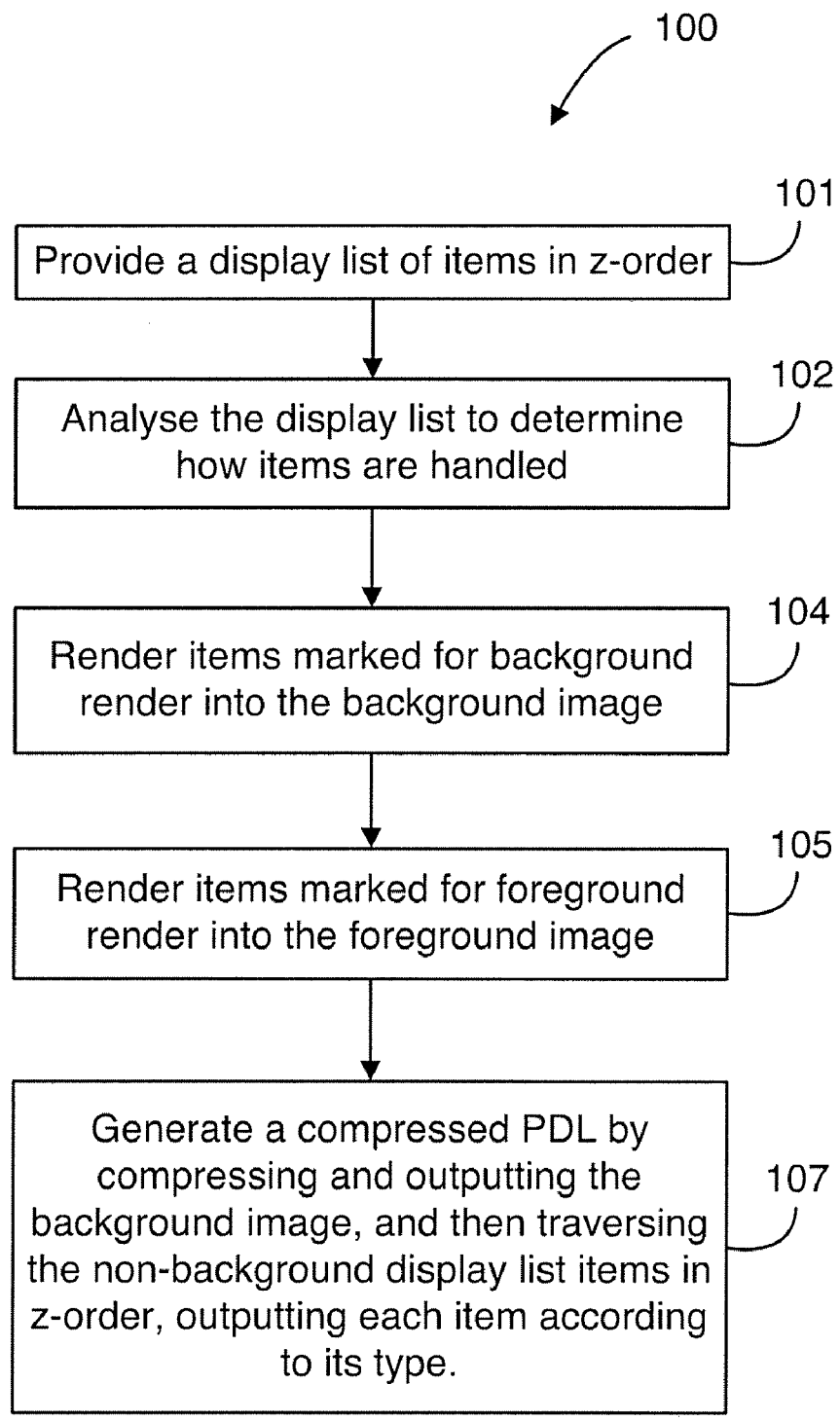
FIG. 1 shows a schematic flow diagram of a method of compressing a PDL script according to an embodiment of the present invention.
Figure 15:
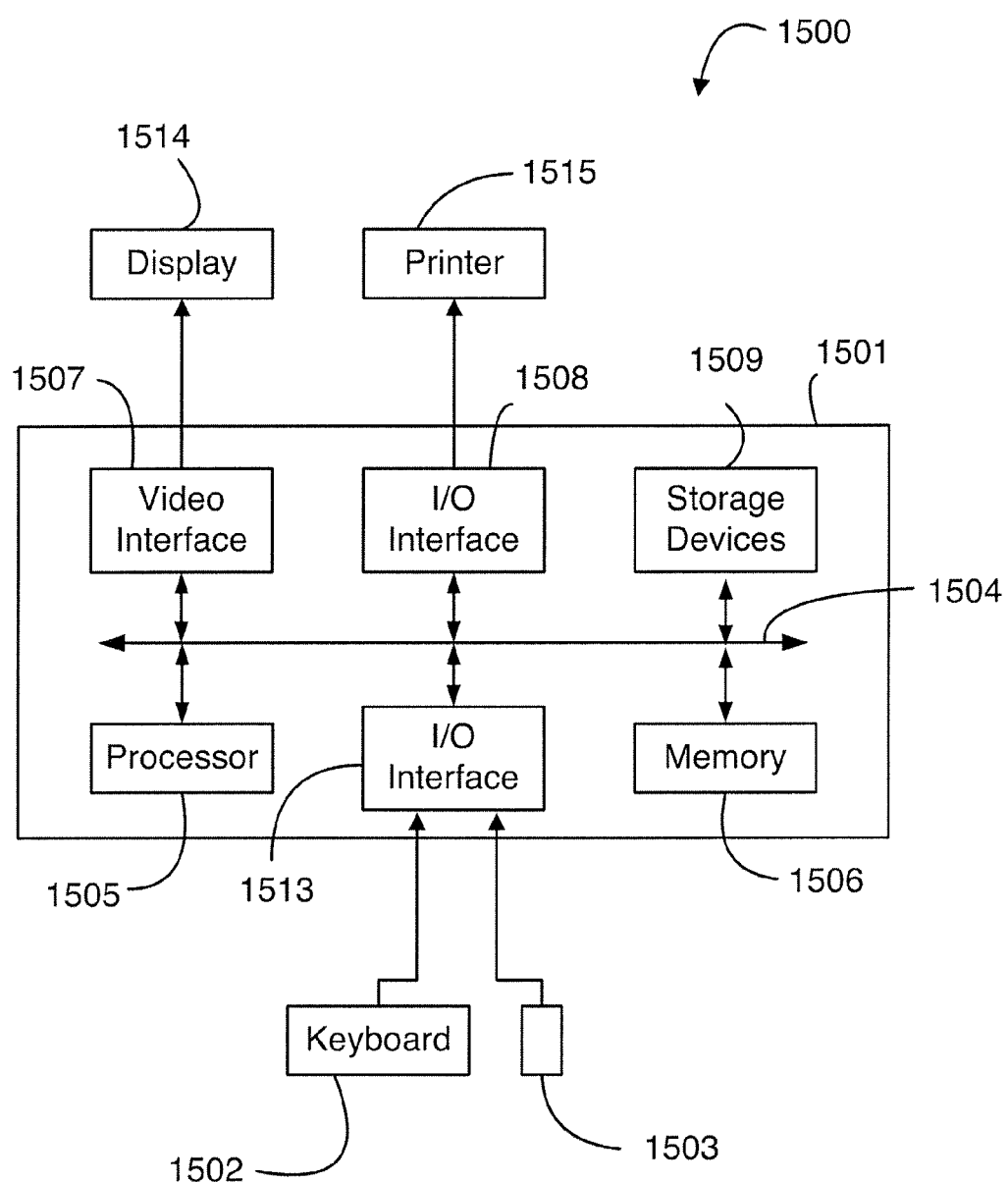
FIG. 15 shows a schematic block diagram of a computer system upon which the method shown in FIG. 1 can be practiced.

FIG. 1 shows a schematic flow diagram of a method 100 of generating output PDL script according to an embodiment of the present invention. The method 100 may be implemented as a software application which executes within a computer system, such as the computer system 1500 shown in FIG. 15. The computer system 1500 preferably uses the Microsoft® Windows® operating system.

The computer system 1500 is formed by a computer module 1501, input devices such as a keyboard 1502 and a mouse pointer device 1503, and output devices including a printer 1515 and a display device 1514. A Modulator-Demodulator (Modem) transceiver device (not illustrated) may be used by the computer module 1501 for communicating to and from a communications network, such as a wide-area network (WAN), Local Area Network (LAN) or the Internet. The computer module 1501 typically includes at least one processor unit 1505, a memory unit 1506, and a number of input/output (I/O) interfaces including a video interface 1507 that couples to the video display 1514, an I/O interface 1513 for the keyboard 1502 and mouse 1503, and an interface 1508 for the printer 1515. Storage devices 1509 are also provided and typically include a hard disk drive (HDD).

The components 1505, to 1513 of the computer module 1501 typically communicate via an interconnected bus 1504 and in a manner which results in a conventional mode of operation of the computer system 1500 known to those in the relevant art.

The software application for implementing the method 100 is resident on the storage device 1509 and is read and controlled in execution by the processor 1505. In some instances the software application may be supplied to the user encoded on one or more CD-ROM and read via a corresponding drive (not illustrated), or alternatively may be read from a network. Still further, the software application may be loaded into the computer system 1500 from other computer readable media. Computer readable media refers to any storage medium that participates in providing instructions and/or data to the computer system 1500 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1501. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

Referring again to FIG. 1, the method 100 starts in step 101 where a PDL interpreter within the software application provides, from a received input PDL script, a display list of items in rendering order (z-order). In the preferred embodiment, some of these items are identified as key items when the display list is constructed. Other embodiments may identify key items at a different time, such as during the analysis phase described hereafter, or by invoking an external process or application that operates on the display list prior to the analysis phase.

Next, in step 102, items in the display list are analysed to determine how those items are to be handled. Items may be:
  marked for render into a single background image at preferably 96 DPI (dots per inch), and then removed from the display list,
  marked for render into both the background image and a single foreground image at preferably 300 DPI (dots per inch), and then removed from the display list,
  converted into a foreground image item, which is in turn marked for render into the foreground image only, or
  classified for output using native PDL commands.

Step 102 is described in detail below. It is noted at this point that key items are never rendered into the background image. Also, some items cannot be output natively, and must be rendered into the background and/or the foreground image, with such items being referred to as must-render items.

In step 104, items marked for background render are rendered into a background image. In step 105, items marked for foreground render are rendered into a foreground image.

The colorspace of the background and foreground images to be selectable. For example, the color values of the background and foreground images may be in the CMYK, RGB or RGBA colorspace.

If the selected foreground image colorspace does not have an alpha channel and therefore does not support transparency, items marked for background render may also be rendered into the foreground image. This extra step ensures the output PDL script generated is visually correct, as will be explained in detail later. If the selected foreground image colorspace supports transparency, items marked for background render do not need to be rendered into the foreground image.

Finally, in step 107, a compressed PDL script is generated by first compressing and outputting the background image, then traversing the remaining non-background display list items in z-order, outputting each item according to the result of the analysis in step 102. In particular:

An item converted into a foreground image item is output as an image, the pixels for which are extracted from the rendered foreground image and compressed. The extracted image has the same position and bounding box attributes as those corresponding to the item.

An item classified for native output is output using the equivalent native PDL commands.

Note that the background image is typically compressed to a greater extent than the foreground images.

Referring again to method 100, step 102 preserves the quality of key items by converting fewer key items into foreground image items and classifying more for native output. However, in order to maintain high compression, the quality of key items has to be preserved without greatly increasing the size of the output PDL script. Hence, step 102 essentially manages a trade-off between output quality and compression.

The following description assumes a key item is a text item; however, as mentioned above, there are other categories of key item depending on the application.

A first item is said to overlie a second item if:

the first item is on top of (later than) the second item in z-order, and the first item overlaps the second item. This may be detected by bounding box or by a more complex intersection algorithm.

The second item is said to underlie the first item.

An item is said to be promoted if it is a non-key item that has been classified for native output.

A promoted item is said to be demoted if the decision to output the item using the equivalent native PDL commands is cancelled. The demoted item is marked for render into the background and possibly also the foreground image.

Ignoring must-render items for a moment, step 102 analyses the items in the display list by traversing the display list and determining how items are to be output as follows:

Text items will be output using the native PDL syntax to show text.

Non-text items overlying text items are promoted for native output, in order to retain text quality beneath.

Non-text items overlying promoted items are also promoted for native output.

Non-text items that do not overlie text items and do not overlie promoted items are marked for render into the background image. The background image can be heavily compressed without affecting output text quality, because text items are never background rendered.

Figure 2:
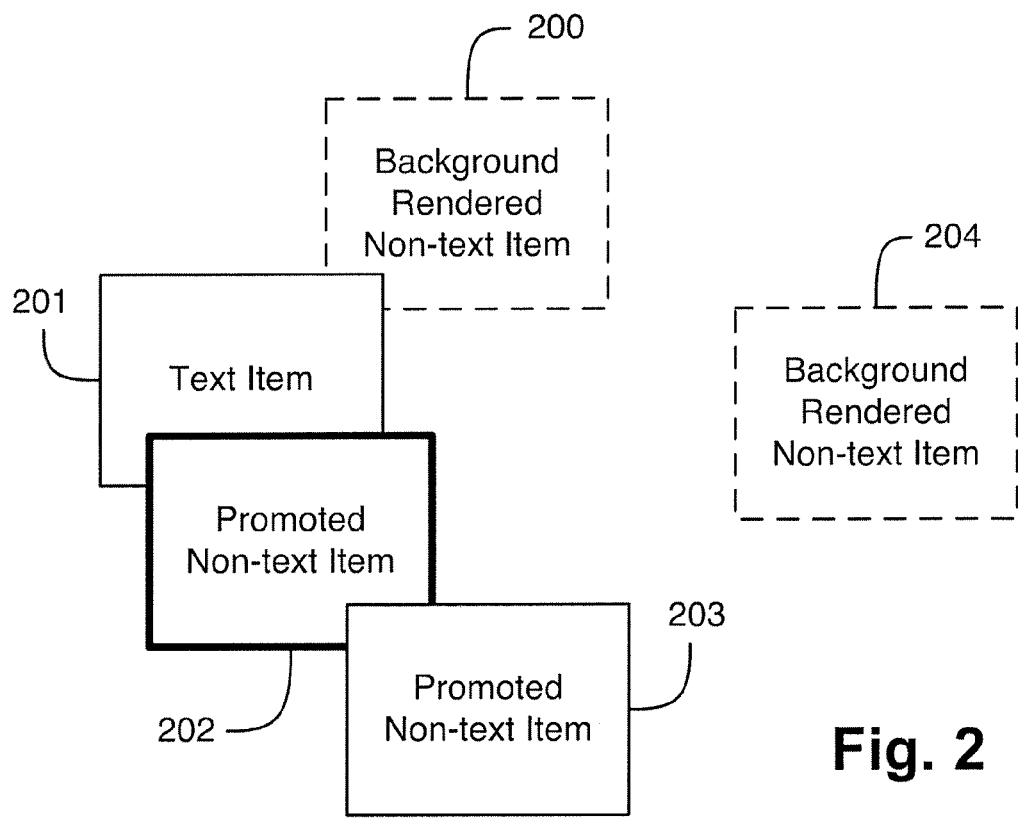
FIG. 2 shows how display list items are analysed in a simple scenario.

FIG. 2 shows how display list items 200 to 204 in a simple scenario are analysed after applying the above rules. Each box in the figure represents the extents of each item 200 to 204 being considered. The items 200 to 204 include a single text item 201, and non-text items 200, and 202 to 204. Text item 201 is output using the native PDL syntax for showing text. Since item 202 overlies text item 201, item 202 is promoted for native output. Item 203 overlies promoted item 202 and is therefore also promoted for native output. Items 202 and 203 are therefore identified as items that either overlie a key item, or overlie another such item previously identified.

Items 200 and 204 are not promoted because they do not overlie text items or promoted items. They are therefore marked for background render.

In some cases, certain items cannot be natively output. The format of the compressed output PDL script may be different from the format of the input PDL script. For example, the input PDL script may be in PDF 1.4 and the desired format of the output PDL script may be a simplified PDF 1.3 document which does not support certain features, such as transparency. When there are features in the input PDL script format which are not supported in the output PDL script format, such as transparency, items which use such features cannot be output natively using the commands of the output PDL script language.

As a result, these items must be simplified by rendering and are referred to as must-render items. Must-render items are handled in the following way:

1. Must-render text items are converted into foreground image items instead of being marked for background render to yield higher quality.
2. Must-render non-text items which overlie text items are handled differently depending on whether the selected foreground image colorspace supports transparency.

If the selected foreground image colorspace does not have an alpha-channel and therefore does not support transparency, the must-render item is marked for background render and the underlying text item is converted into a foreground image item. The must-render item must also be marked for foreground render. When the compressed PDL script is generated in step 107, the foreground image representing the text item is placed on top of the background image. This foreground image is completely opaque. If the must-render item is not also foreground rendered, the part of the foreground image representing the text item that covers the must-render item will obscure the must-render item in the background image. Therefore, must-render items marked for background render which overlie a foreground image item must also be marked for foreground render.

However, if the selected foreground image colorspace supports transparency, the must-render item is converted into a foreground image item and the text item is output using the native PDL syntax to show text. The alpha channel of the foreground image representing the must-render item can be used to mask out non-object foreground pixels so that the text beneath the foreground image will be visible. Hence there is no need for the text item to be converted into a foreground image item.

Figure 3:
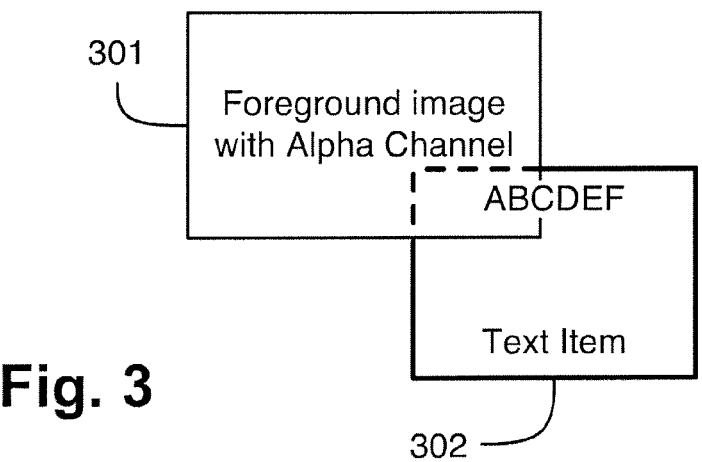
FIG. 3 shows a scenario where a foreground image with an alpha channel overlies a text item.

FIG. 3 shows a simple scenario where must-render item 301 overlies text item 302. In this scenario, the selected foreground image colorspace has an alpha channel. As a result, must-render item 301 is converted into a foreground image item and text item 302 will be output using the native PDL syntax to show text. The text item 302 does not need to be marked for foreground render because the alpha channel of the foreground image representing item 301 can be used to mask out non-object foreground pixels, thereby allowing the underlying text to become visible.

3. Must-render items which overlie promoted items are converted into foreground image items and then promoted to allow any overlying non-text items to also be promoted.
4. Must-render items which overlie items marked for background render or do not overlie any items are marked for background render.

As described earlier with reference to method 100, if the selected foreground image colorspace does not have an alpha channel and therefore does not support transparency, items marked for background render underlying a foreground image item are rendered into both the background and foreground images. If items marked for background render are not also rendered into the foreground image, when a foreground image item overlies an item marked for background render, the overlapping part of the foreground image will obscure the underlying background image item.

Always promoting non-text items as described above may lead to many items being output natively. This may lead to an increase in output PDL script file size. An alternate embodiment of the invention allows the trade-off between compression and quality performed in step 102 to be controlled. Which items are promoted is determined by the value of an adjustable promote threshold. Each time a non-text item is considered for promotion to native output, the adjustable promote threshold is used to determine if that non-text item should be promoted.

The promote threshold is used in the following way:
Estimate a total native size. This is an estimate of the output PDL file size if the current item is promoted.
Estimate a total render size. This is an estimate of the output PDL file size if the current item is not promoted.
If the total native size is greater than the total render size by a certain factor (computed from the promote threshold), the current item is not promoted. Otherwise, the current item is promoted.

The result of not promoting the current item can be quite complex. For high compression, non-promoted items are background rendered. However, if the current item is background rendered, then all items underlying the current item must also be background rendered to ensure the visual correctness of the output PDL script.

Figure 4:
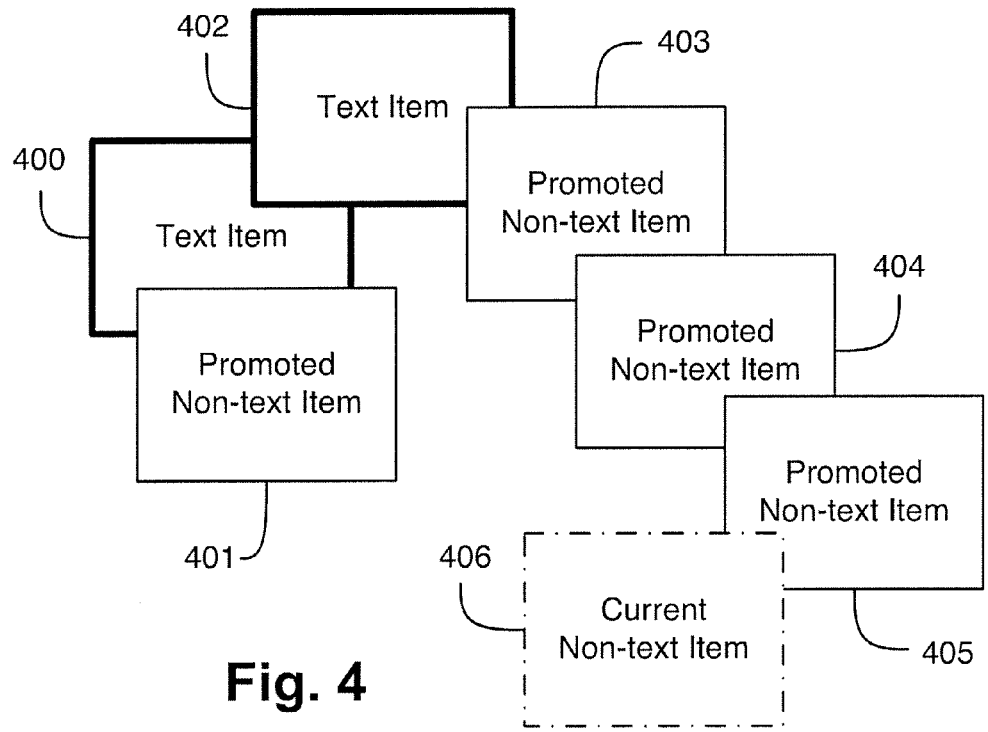
FIG. 4 shows a scenario where a non-text item is being considered for promotion in a threshold-based embodiment of the invention.

To illustrate the effect of not promoting a current item, consider the sample scenario shown in FIG. 4. The scenario includes text items 400 and 402, and non-text items 401, 403, 404 and 405 either overlying one of the text items 400 and 402, or overlying a promoted item. Item 406 is currently considered for promotion, with item 406 overlying promoted item 405. If item 406 is not promoted, that item 406 will have to be background rendered. This will have a cascading effect, causing items 405, 404 and 403 to lose their promoted status (i.e. be "de-classified") and be background rendered.

Rendering item 403 into the background image will further cause text item 402 to be converted into a foreground image item. Converting text item 402 into a foreground image item will cause text item 400 to be converted into a foreground image item. Because text item 400 is no longer output using the native PDL syntax for showing text, item 401 overlying item 400 will preferably lose its promoted status and be background rendered for higher compression.

Figure 5:
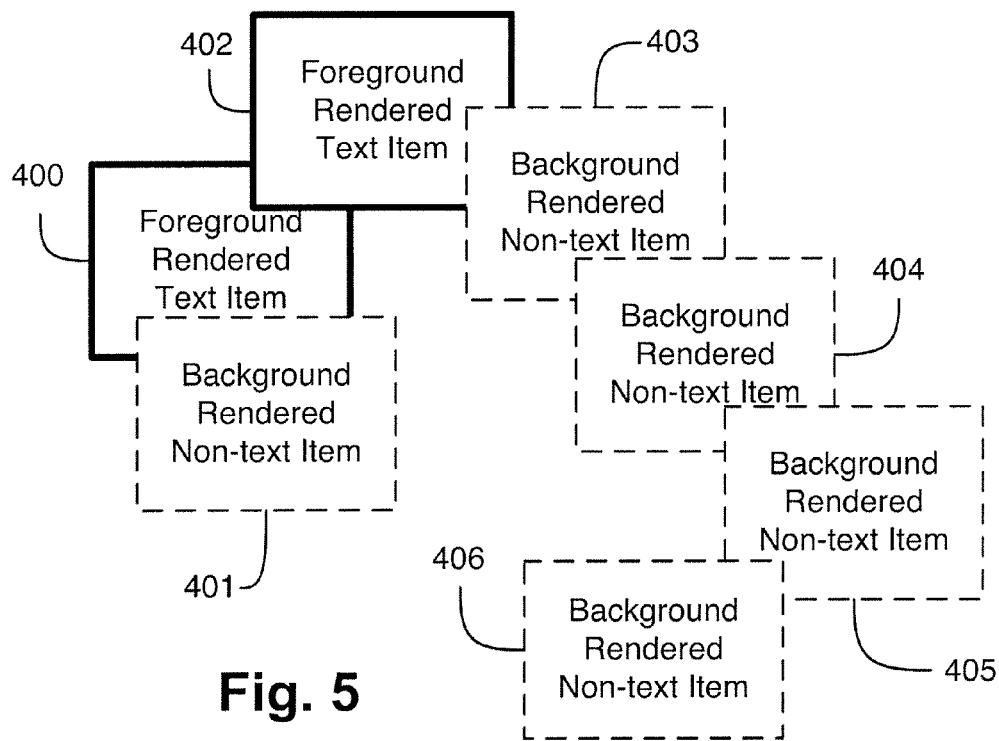
FIG. 5 shows the result occurring in the scenario of FIG. 4 when the non-text item is not promoted.

FIG. 5 shows the final result of not promoting item 406. Items 401, 403, 404, 405 and 406 are rendered into the background image and removed from the display list. Items 400 and 402 are rendered into the foreground image at a higher resolution for improved visual quality.

As explained earlier, if the selected foreground image colorspace does not support transparency, items marked for background render which overlie a foreground image item must also be foreground rendered. Hence item 403 of FIG. 5 must also be foreground rendered, since item 403 overlies foreground image item 402. Similarly, item 401, which overlies foreground image item 400, must also be foreground rendered.

However, if the selected foreground image colorspace supports transparency, the foreground image alpha channel can be used to mask out pixels in the foreground images corresponding to items 400 and 402 which are covered by items 401 and 403, thereby avoiding foreground rendering items 401 and 403.

Figure 6A:
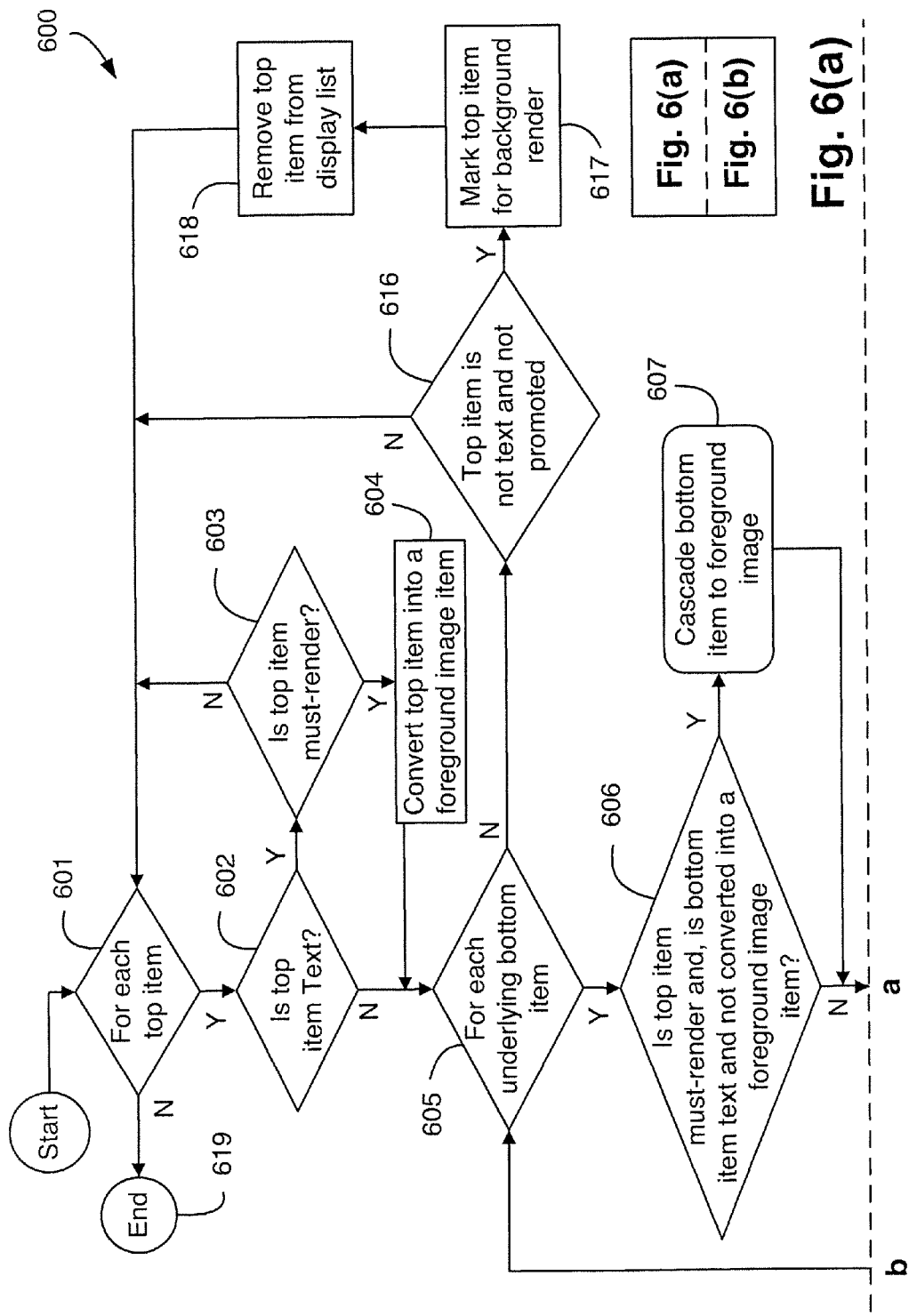
FIG. 6 which includes FIG. 6(a) and FIG. 6(b) shows a schematic flow diagram of a method of analysing items according to one embodiment of the invention.
Figure 6B:
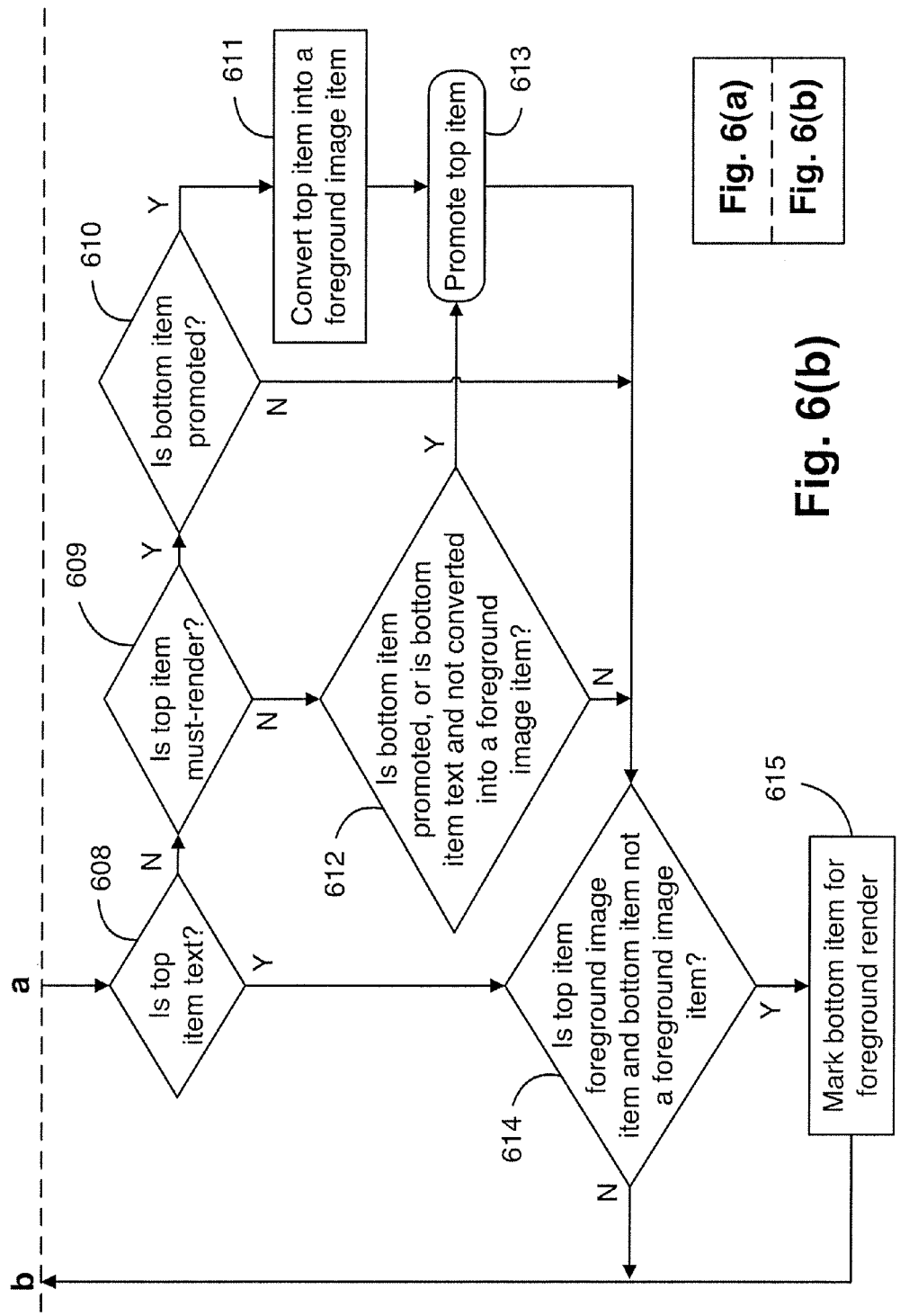

Having described the analysis performed in step 102 generally, step 102 is now described in detail with reference to the schematic flow diagram in FIG. 6. This diagram shows a method 600, according to the first embodiment of step 102 (assuming no transparency in foreground image colorspace), of analysing the items in the display list. Method 600 starts in step 601 where the display list of items is traversed, starting with the item which has the lowest z-order. In step 602 it is determined whether the item currently being considered, referred to as the top item, is text. If it is determined that the top item is text, then it is determined in step 603 whether the top item is a must-render item. It the text top item is not a must-render item, then no action is performed on that item and the method 600 returns to step 601. The item remains in the display list and will be output using native PDL commands.

If it is determined in step 603 that the top text item is a must-render item, then the top item is converted into a foreground image item. The top item will be foreground rendered, not background rendered, for higher visual quality.

If the top item is either not text, or is text but has been converted into a foreground image item, method 600 continues to step 605 from where each item underlying the top item, referred to as a bottom item, is considered.

If it is determined in step 605 that such a bottom item exists it is determined in step 606 whether the top item is a must-render item and the bottom item is text that has not been converted into a foreground image item. If step 606 is determined in the affirmative the bottom item is converted into a foreground image item in step 607. This conversion may have a cascading effect, causing text items underlying the bottom item to also be converted into foreground image items. The steps of step 607 are described in more detail with reference to FIG. 9.

If the determination in step 606 is in the negative, or following step 607, the method 600 continues to step 608 where it is determined whether the top item is text. If it is determined that the top item is not text, it is then determined in step 609 whether the top item is a must-render item. If the top item is a must-render item and it is determined in step 610 that the bottom item has been promoted, then the top item is converted into a foreground image item in step 611 and then promoted in step 613. Even though the top item is a must-render item, which means the top item cannot be output using native PDL commands, tracking the promotion status of must-render items allows other items on top of the present top item to be promoted. Step 613 is described in detail with reference to FIG. 8.

If it is determined in step 609 that the top item is not a must-render item, it is then determined in step 612 whether the bottom item has either been promoted, or is text that has not been converted into a foreground image item. If step 612 is determined in the affirmative then the top item is promoted for native output in step 613.

If it is determined in step 608 that the top item is text, or in step 610 that the bottom item has not been promoted, or that the top item has been promoted in step 613, or that step 612 was determined in the negative, then the method 600 continues to step 614. In step 614 it is determined whether the top item has been converted into a foreground image item while the bottom item has not been converted into a foreground image item. If the previous steps converted the top item into a foreground image item, but the bottom item has not been converted into a foreground image item, the bottom item is marked for foreground render in step 615. The method 600 then returns to step 605 from where the next item underlying the top item is considered, If step 605 determines that all underlying (bottom) items have been considered with regards to the current top item, processing continues to step 616 where it is determined whether the top item is not text and has not been promoted. If the determination of step 616 is in the affirmative, then the top item is marked for background render in step 617 and removed from the display list in step 618.

Following step 618, or if step 616 is determined in the negative, then the method 600 returns to step 601 from where the next top item is considered until all display list items have been considered.

Each non-text item has the following attributes:
A promote flag, which indicates whether the item has been promoted for native output.
A promote reference count, which indicates how many times that item has been promoted. An item may be promoted for native output multiple times by different underlying items.
A promotee list, which is a data structure representing a list of references to items that the current item has caused to be promoted.
A promoter list, which is a data structure representing a list of references to items that have caused the current item to be promoted.

Figure 7:
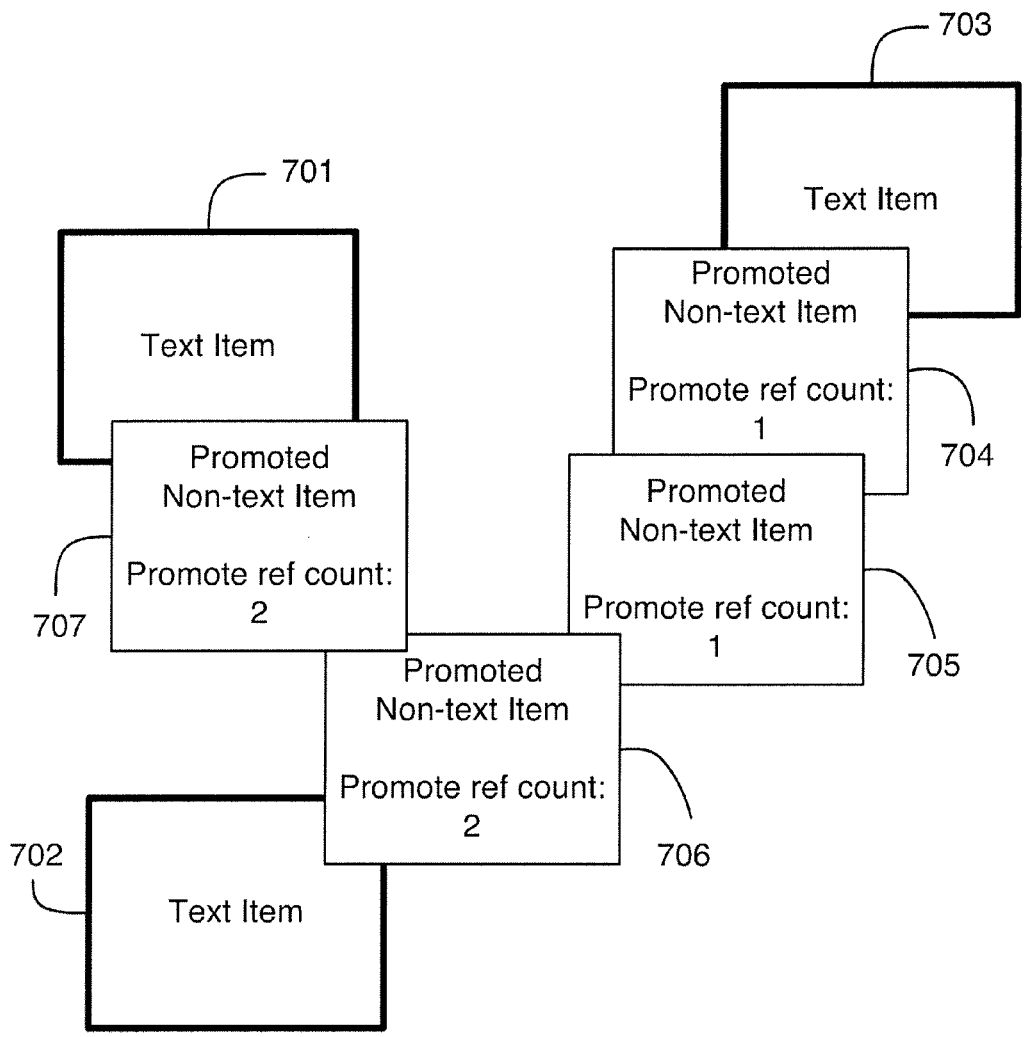
FIG. 7 shows how items are promote reference counted in a simple scenario.

FIG. 7 illustrates how the promote reference count attribute is used in a simple scenario. The scenario includes three text items 701, 702, and 703, as well as four non-text items 704, 705, 706, and 707. Text Item 703 causes overlying item 704 to be promoted once, and its promote reference count to be 1. Promoted item 704 in turn causes overlying item 705 to be promoted once, and causing its promote reference count also to be 1. Item 706 overlies both text item 702 and promoted item 705, and is therefore promoted twice, causing its promote reference count to be 2. Similarly, item 707 overlies text item 701 and promoted item 706 and is therefore also promoted twice.

Figure 8:
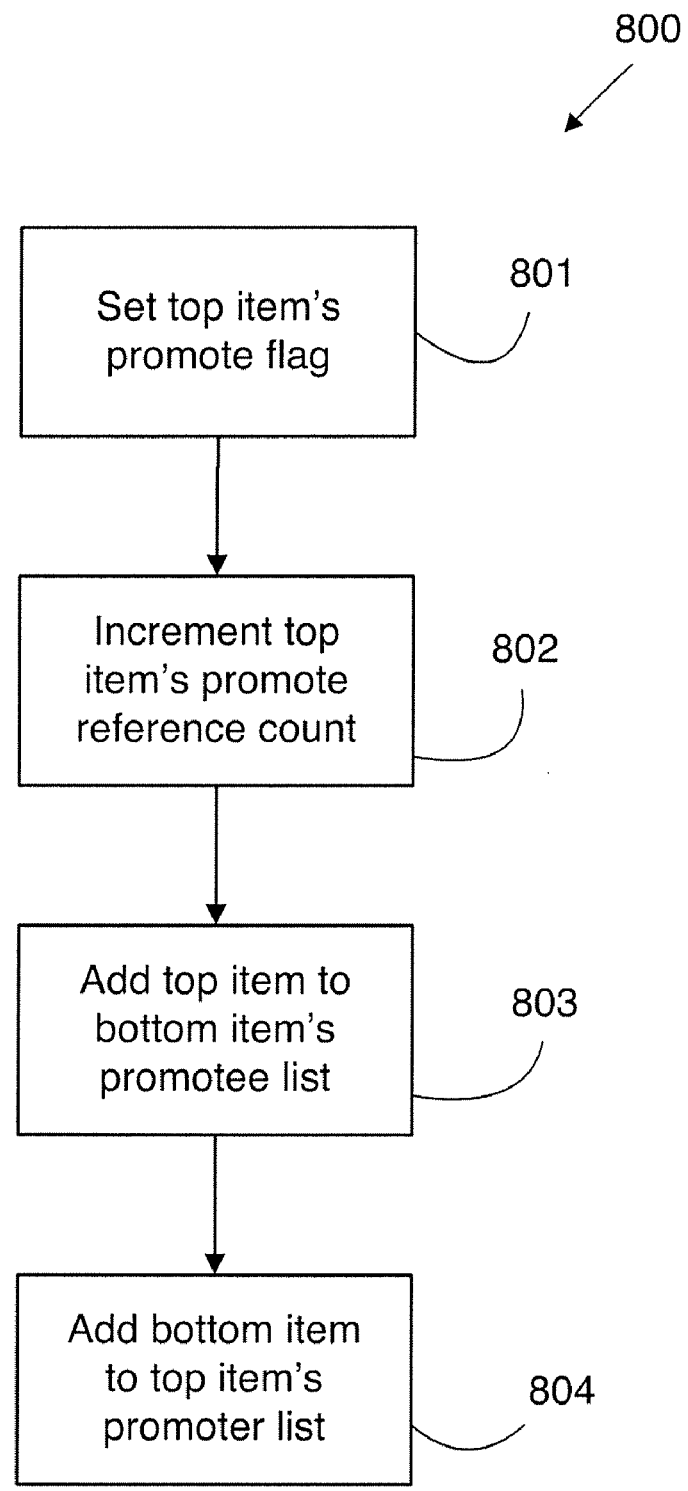
FIG. 8 shows a schematic flow diagram of a method of promoting an item, as used in the method of FIG. 6.

A method 800 of promoting a top item for native output, as used in step 613 of method 600, is now described in detail with reference to the schematic flow diagram shown in FIG. 8. In the description, the top item being promoted is referred to as the promotee. The bottom item is the item that is causing the top item to be promoted, and is referred to as the promoter.

The method 800 starts in step 801 where the top item's promote flag is set. Then, in step 802, the top item's promote reference count is incremented. The top item is added to the bottom item's promotee list in step 803. Finally, the bottom item is added to the top item's promoter list in step 804.

Figure 9:
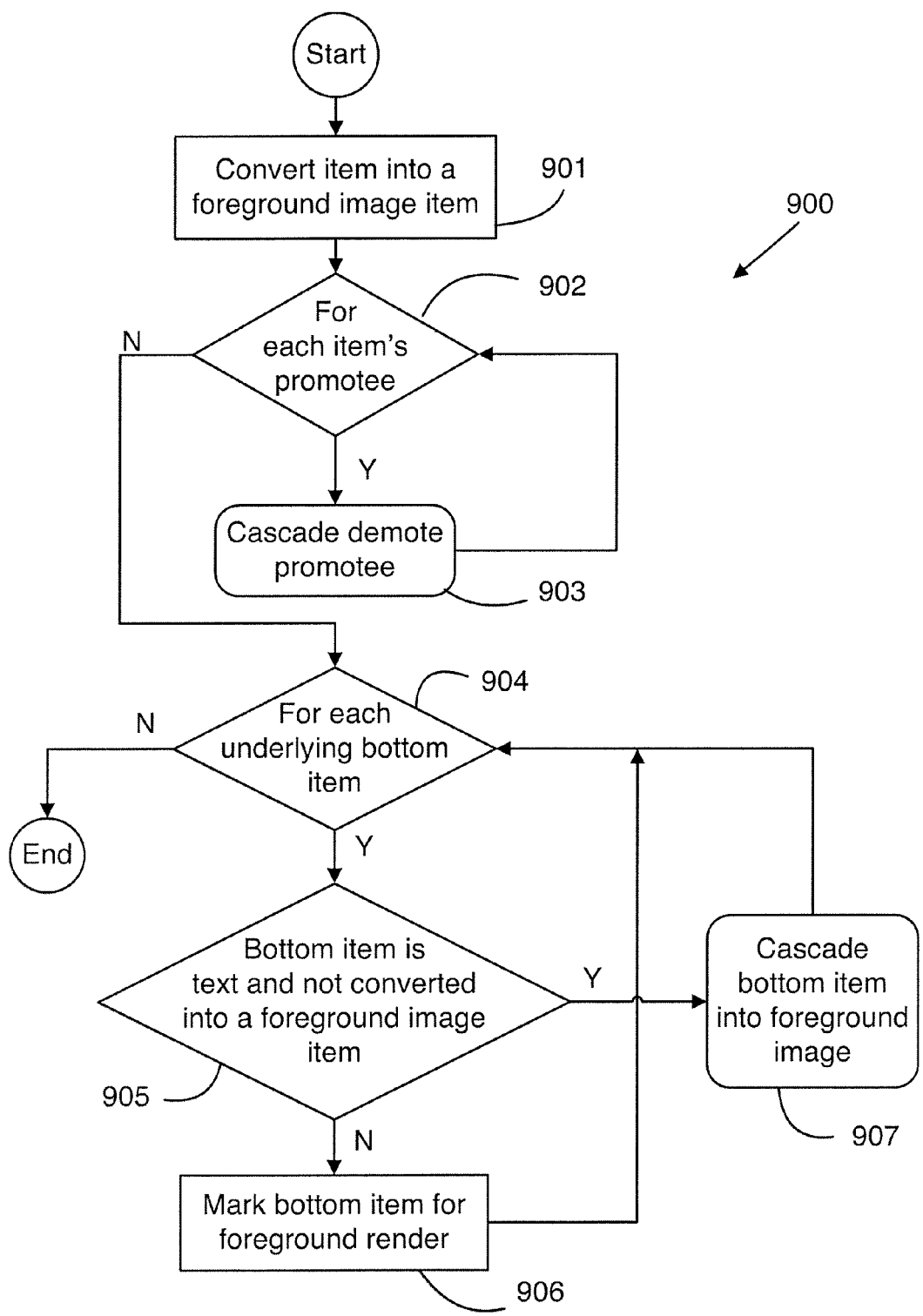
FIG. 9 shows a schematic flow diagram of a method of cascade converting an item into a foreground image, as used in the method of FIG. 6.

Next, a method 900 of converting a bottom text item into a foreground image item in cascading manner, as used in step 607 of method 600 (FIG. 6), is described in detail with reference to the schematic flow diagram shown in FIG. 9. Method 900 starts in step 901 where the bottom item, which is a text item, is converted into a foreground image item. Each of the bottom item's promotees is cascade demoted in steps 902 and 903. Step 903 where a promotee is cascade demoted is described in greater detail below with reference to FIG. 10.

Next, in steps 904 and 905, it is determined for each overlapping bottom item whether that item is text which is not classified as a foreground image item. All non-text items that have been promoted by the bottom text item, either directly or indirectly through a chain of other promoted non-text items, are marked for rendering into the background image to allow for greater compression. This is preferable because the bottom text item has been converted into a foreground image item in step 901 and will no longer be output using the native PDL syntax to show text.

All items underlying the bottom text item which are text and not converted into a foreground image item, as determined in steps 904 and 905, are converted in step 907 into foreground image items in a cascading manner. Step 907 recursively calls method 900. All other underlying items are marked for foreground render in step 906.

Figure 10:
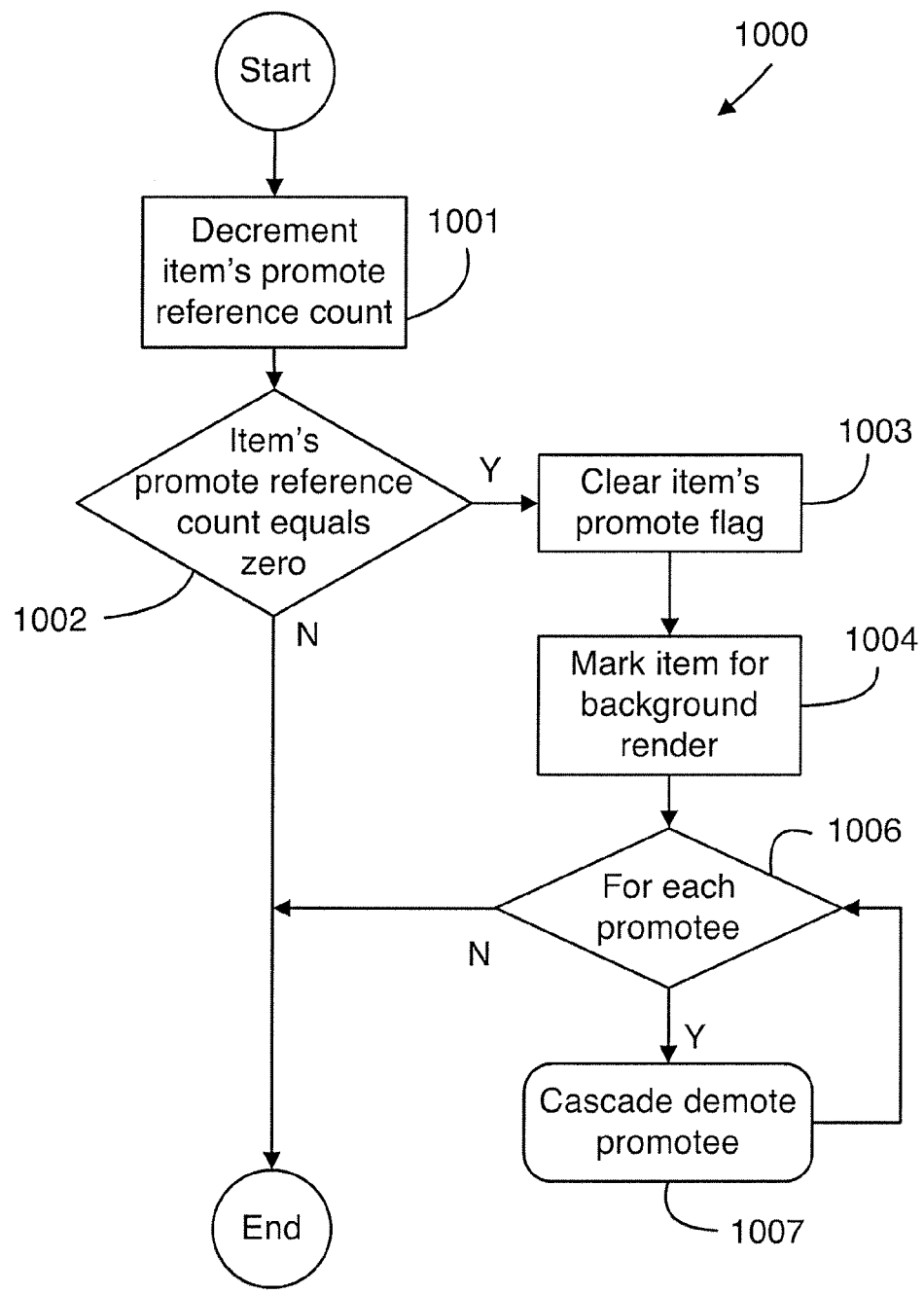
FIG. 10 shows a schematic flow diagram of a method of cascade demoting an item, as used in the method of FIG. 9.

A method 1000 of cascade demoting a promotee item, as used in step 903 of method 900 (FIG. 9), is now described in greater detail with reference to the schematic flow diagram shown in FIG. 10. The method 1000 starts in step 1001 where the item's promote reference count is decremented. It is only when the item's promote reference count reaches zero that the item's promote status is lost and its promote flag is cleared. Accordingly, step 1002 determines whether the item's promote reference count has reached zero. If it is determined that the item's promote reference count has not reached zero, no further action is taken and method 1000 ends.

However, in the case where step 1002 determines that the item's promote reference count has reached zero the item's promote flag is cleared in step 1003. Because the item is no longer promoted, the item is also marked for background render in step 1004 and removed from the display list in step 1005. Each of the item's promotees is then cascade demoted in steps 1006 and 1007 by recursively calling method 1000 for each promotee. After all promotees have been cascade demoted, the method 1000 ends.

Figure 11A:
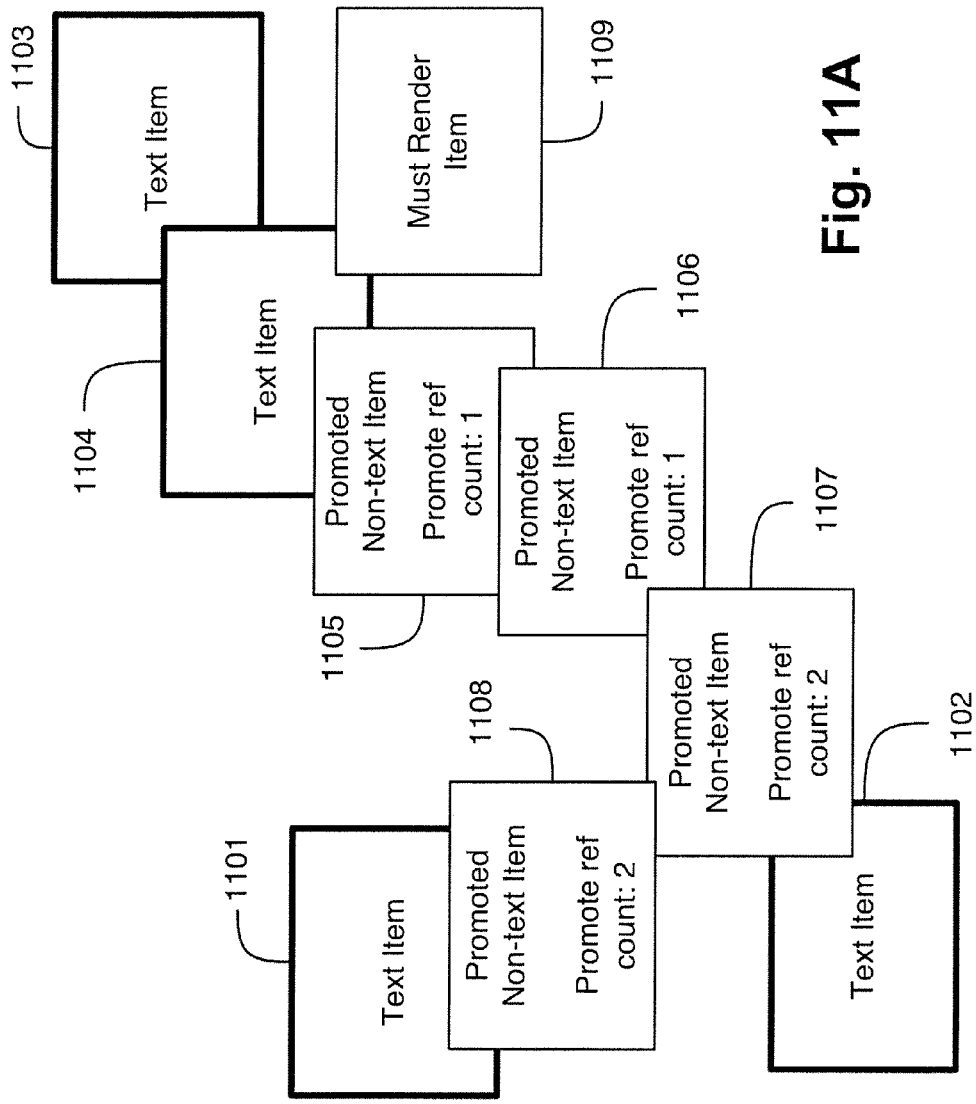
FIGS. 11A and 11B show the effect of converting a bottom text item into a foreground image item in cascading manner and demoting a promotee in a cascading manner in a simple scenario.
Figure 11B:
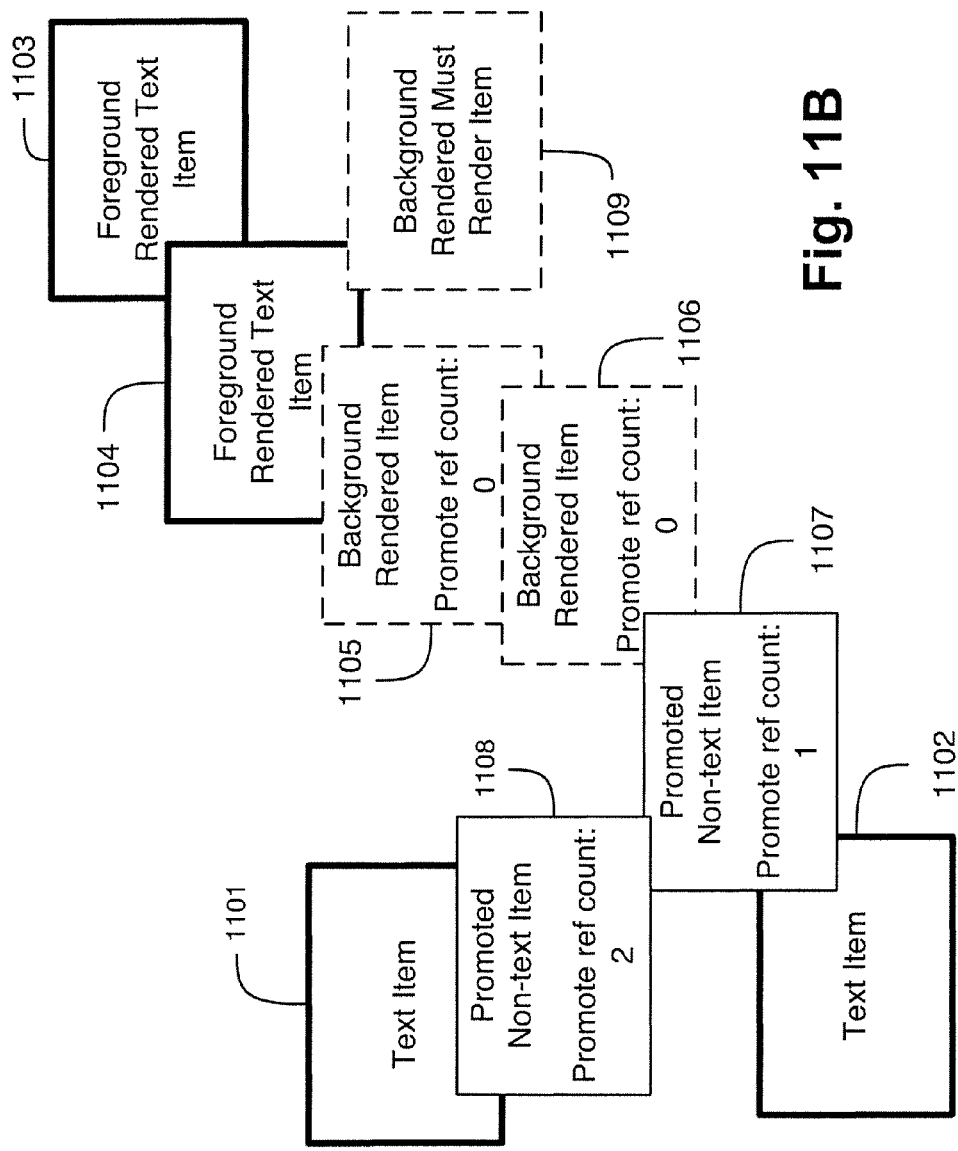

FIG. 11B illustrates the effect of performing step 607 (FIG. 6) of converting a bottom text item into a foreground image item in cascading manner and step 903 (FIG. 9) of cascade demoting a promotee in a simple scenario illustrated in FIG. 11A. The scenario includes a must-render item 1109 which has the highest z-order, which means item 1109 is the last item in the display list to be processed. FIG. 11A shows the state of the items before item 1109 is processed:

text items 1101, 1102, 1103 and 1104 have not been converted into foreground image items and therefore will be output using the native PDL syntax to show text;
items 1105 and 1106 have been promoted, with each having a promote reference count of one;
items 1107 and 1108 have been promoted, with each having a promote reference count of two.

When step 606 detects that the must-render top item 1109 overlies text item 1104, item 1104 is converted into a foreground image item in step 607 (901). Further, because step 607 is performed in a cascading manner, item 1103 is also converted into a foreground image item (907). Yet further, the cascade demote operation is performed on item 1104's promotee item 1105 and all its promotees (903), causing items 1105 and 1106 to decrement their promote reference count to zero (1001), and thus lose their promoted status (1003) and be marked for background rendering (1004). Item 1107 also has its promote reference count decremented, but item 1107 is not actually demoted, because item 1107 has a final promote reference count of one. Item 1108's promote reference count remains at two. Items 1107 and 1108 therefore retain their promoted status. Must-render item 1109 is background rendered. Text Items 1101 and 1102 will be output using the native PDL syntax to show text.

For reasons already explained, always promoting non-text items to be output natively may lead to an increase in the output PDL script file size. An alternative embodiment where the trade-off between compression and quality is controlled by setting an adjustable promote threshold is now described in more detail. Preferably the promote threshold is in the range zero to ten. Items that are promoted will be output natively instead of being output as rendered images. This allows the underlying text to be output using the native PDL syntax for showing text, rather than being rendered.

The promote threshold has the following ranges:

| | |
|---|---|
| 0 | Promotion is disabled. |
| 1-9 | Promotion is enabled, and the embodiment will increasingly prefer to promote non-text items at the possible expense of output file size. |
| 10 | Promotion always occurs. |

It is noted that the case where the promote threshold is set to a value of 10 corresponds to the first embodiment where step 102 is performed according to the steps described with reference to FIG. 6. The alternate embodiment of step 102 is very similar to the first embodiment of FIG. 6, with the fundamental difference being that, once an item has been selected for possible promotion, the threshold is used to check whether the item should actually be promoted.

Figure 12A:
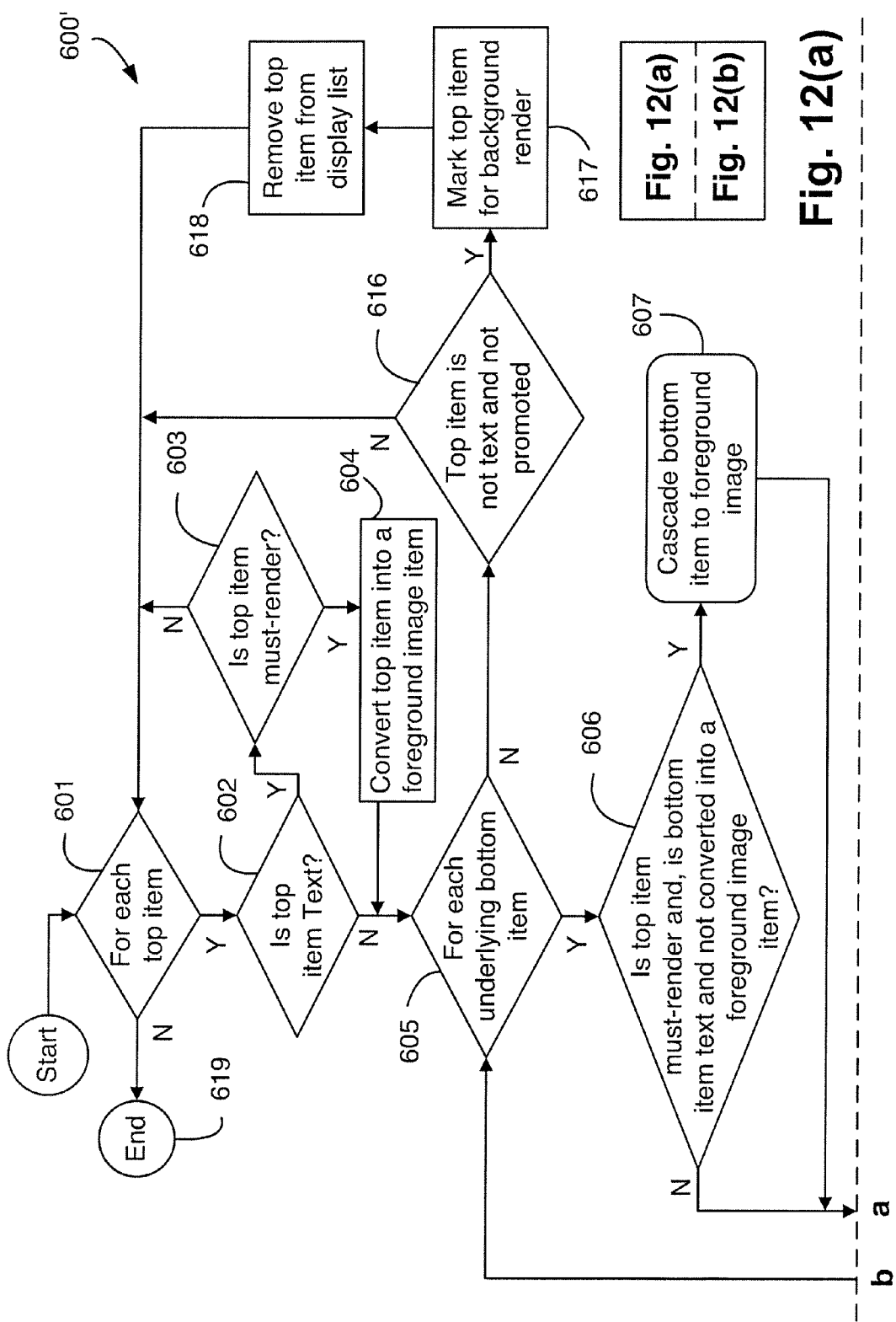
FIG. 12 which includes FIG. 12(a) and FIG. 12(b) shows a schematic flow diagram of a method of analysing items according to an alternative embodiment.
Figure 12B:
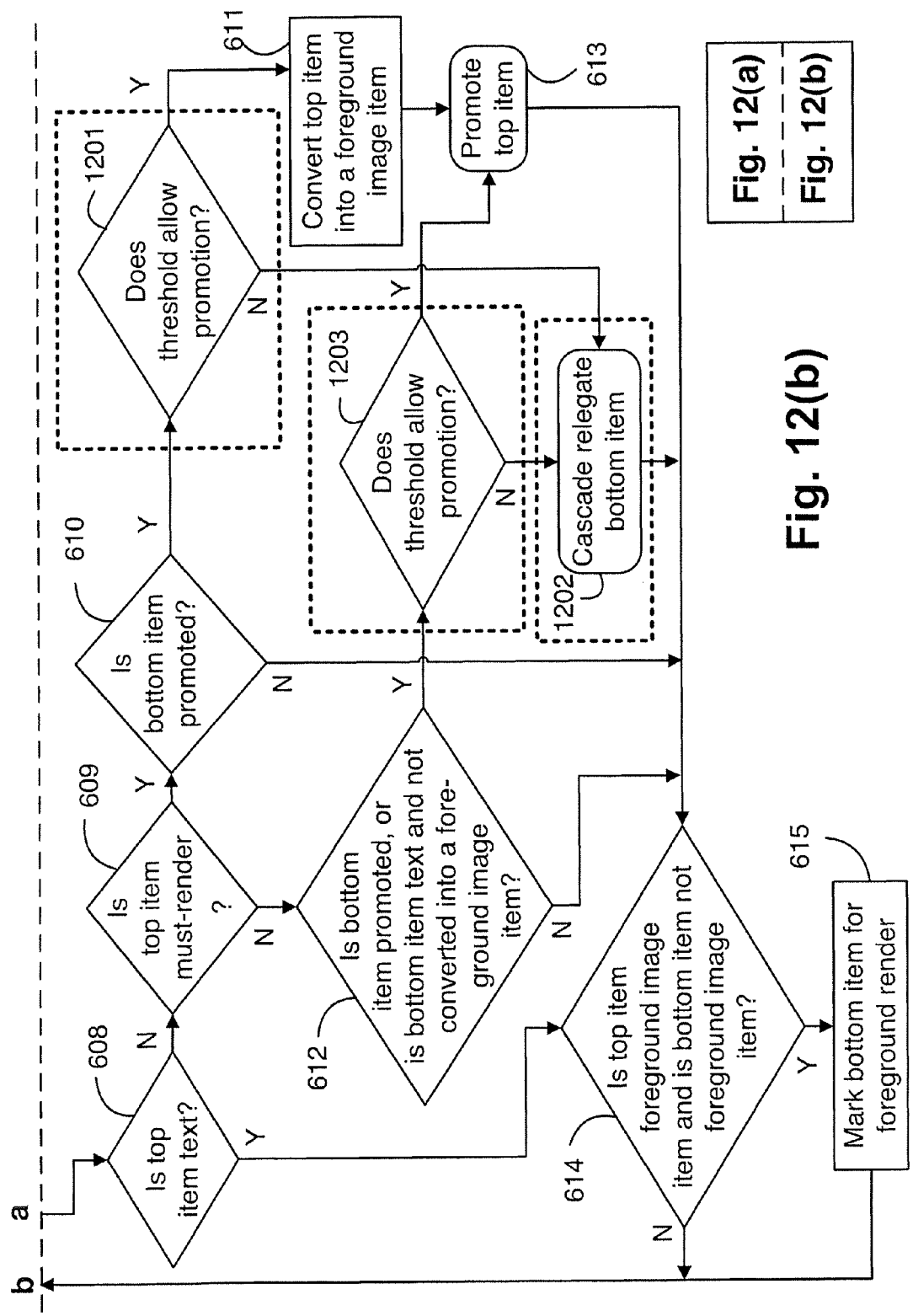

The alternate embodiment of step 102 is shown in the schematic flow diagram shown in FIG. 12. The steps in FIG. 12 include all the steps of the flow diagram shown in FIG. 6, without change, but include three additional steps 1201, 1202 and 1203 (outlined with dashed boxes in FIG. 12).

If, in steps 608, 609 and 610, it is determined that the top item is not text and is must-render, and the bottom item is promoted, the top item is converted into a foreground image item in step 611 and promoted in step 613 only if it is first determined in step 1201 that it is appropriate to do so. The manner used to determine whether it is appropriate to promote an item based upon the promote threshold is described in more detail with reference to FIG. 13.

If the promote threshold does not allow the promotion to occur, the bottom item is cascade relegated in step 1202 before processing continues to step 614. All promoted items underlying the bottom item lose their promoted status and are marked for background image. This has a cascading effect which stops when the text item(s) which originally caused the promotion has been converted into foreground image item(s). The steps of the cascade relegate operation of step 1202 are described in greater detail below with reference to FIG. 14.

If, in steps 608, 609 and 612, it is determined that the top item is not text and is not must-render, and the bottom item is promoted, or is text but has not been converted into a foreground image item, then the top item is promoted in step 613 only if it is first determined in step 1203 that the promote threshold allows that top item to be promoted. If the promote threshold does not allow the promotion to occur, the bottom item is cascade relegated in step 1202.

Figure 13:
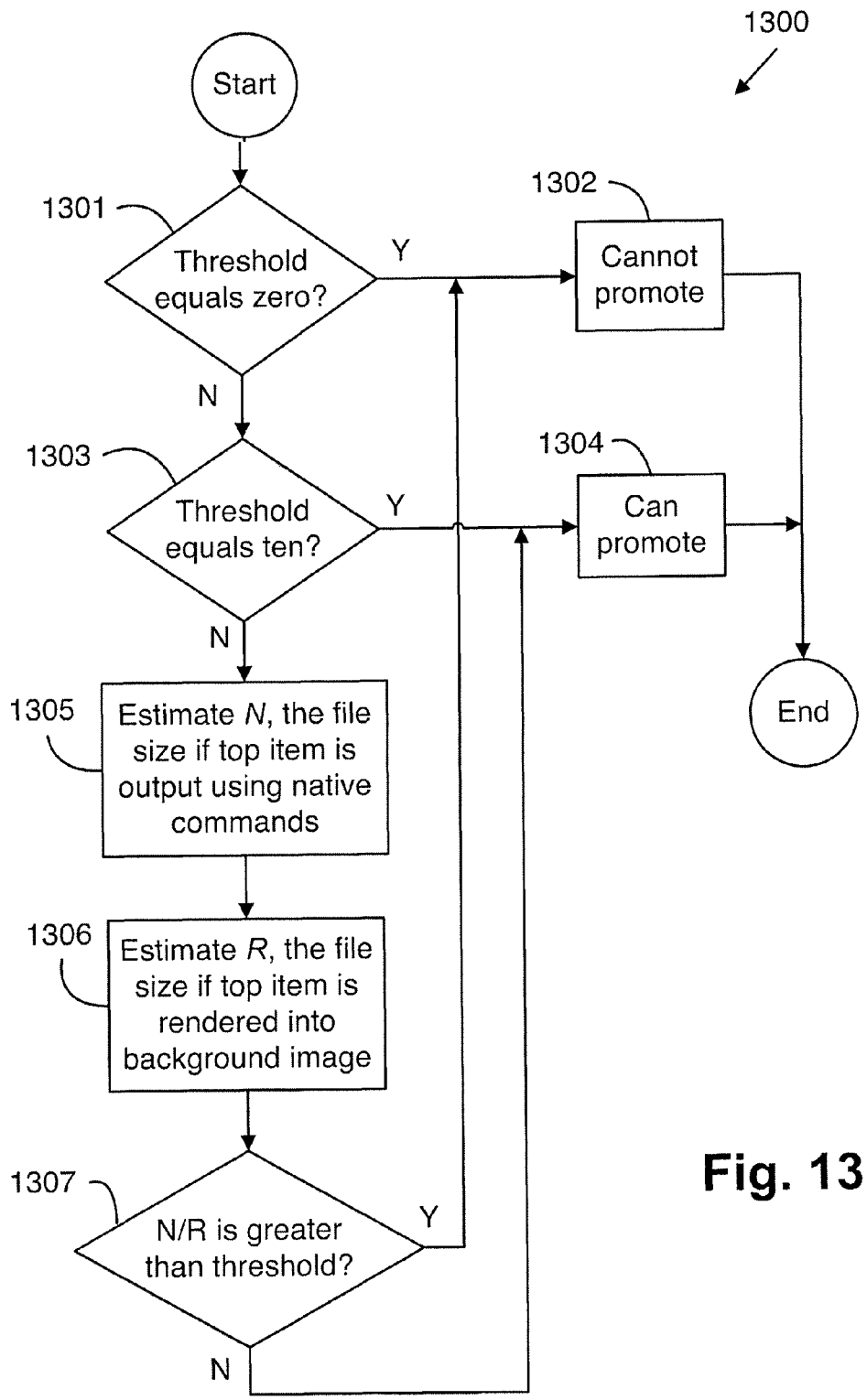
FIG. 13 shows a schematic flow diagram of a method of deciding whether items are promoted, as used in the alternate embodiment of FIG. 12.

A schematic flow diagram of a method 1300 of determining whether the adjustable promote threshold allows an item to be promoted, as used in steps 1201 and 1203 (FIG. 12) is shown in FIG. 13. The method 1300 starts in step 1301 where it is determined whether the promote threshold is equal to zero. If the promote threshold equals zero, the output of the method 1300, set in step 1302, is that promotion of the item is not allowed.

If the promote threshold is not zero, it is determined in step 1303 whether the promote threshold equals ten. If the promote threshold equals ten, the output of the method 1300, set in step 1304, is that promotion of the item is allowed.

Otherwise, the output file size if the top item is output using the equivalent native PDL commands is estimated in step 1305 as value N. Then the output file size if the top item is rendered into the background image is estimated in step 1306 as value R. Rendering the top item into the background image will cause all underlying items to also be background rendered. The estimate for R must account for this cascading effect.

In step 1307 it is then determined whether N divided by R is greater than the promote threshold. If that ratio N/R is greater than the promote threshold, promoting the top item would unacceptably increase the output file size relative to the output file size if the top item were background rendered. Accordingly, the output of the method 1300 is set in step 1302 that promotion is not allowed. Otherwise, the output of the method 1300 is set in step 1304 that promotion is allowed.

Figure 14:
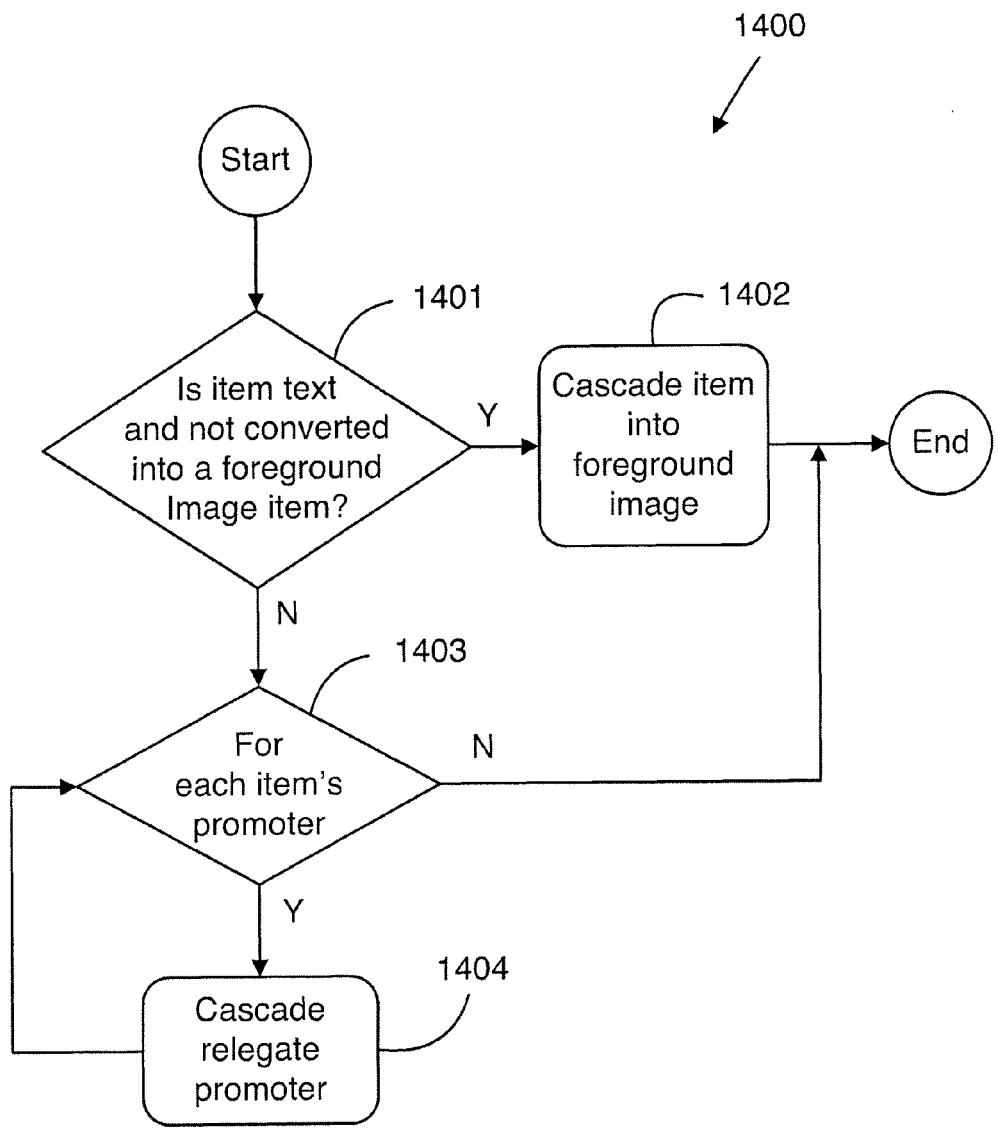
FIG. 14 shows a schematic flow diagram of a method of cascade relegating an item, as used in the alternate embodiment of FIG. 12.

Step 1202 (FIG. 12) of cascade relegating an item is now described in greater detail with reference to the schematic flow diagram shown in FIG. 14. Step 1202 starts in step 1401 where it is determined whether the item is text and has not been converted into a foreground image item. If that determination is in the affirmative, then the item is converted into a foreground image item in a cascade manner by calling method 900 of FIG. 9. The method 1400 ends after step 1402.

Otherwise, if step 1401 is determined in the negative, in steps 1403 and 1404, each of the item's promoters is cascade relegated by recursively calling method 1400 for each promoter. Once all the promoters have been cascade relegated, the method 1400 ends.

The embodiments described above can be applied to other key items that do not necessarily relate to text. For example, the embodiments can apply to vector graphical objects in CAD drawings for which measurement data must be extractable in the compressed PDL script.

Must-render items were described above as items which cannot be output in the native PDL syntax directly corresponding to the item's type because the items' type is not supported in the output PDL script format. These must-render items must therefore be simplified by rendering.

However, must-render items do not necessarily have to be restricted to these items. Items for which output at reduced quality is desirable can also be classified as must-render items. Moreover, the determination of which items must be rendered can also be based on PDL script data. For example, there may be text or other graphical objects which must not be extractable in the compressed PDL script due to security or privacy reasons. The invention can handle these graphical objects by rendering them to pixels.

As can be seen from the embodiments described, a highly compressed output PDL script is created by rendering some of the input items to pixels. Those pixels may be formed into one or more images. In the case where more than one image is formed, those images may be compressed at different quality levels. The quality of certain items is retained due to the fact that those items are output in the PDL script as equivalent native PDL commands.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

We claim:

1. A method of generating a compressed page description from a list of items to be rendered to a page, at least one of said items belonging to a class of key items, comprising the steps of:
    classifying one or more non-key items which would overlie at least one key item when rendered to said page by:
       estimating an increase in size of the compressed page description comprising the one or more non-key items if said one or more non-key items are described in compressed page description using page description commands;
       classifying said one or more non-key items described using said page description commands if said increase is less than a threshold;
    declassifying a previously classified non-key item if said increase is greater than said threshold, wherein said previously classified non-key item is either:
       (i) underlying the classified non-key item; or
       (ii) underlying a previously declassified non-key item;
    rendering to image data at least one other non-key item; and
    generating said compressed page description, comprising:
       page description commands describing said at least one key item;
       page description commands describing said at least one classified non-key item; and
       said rendered image data of said at least one other non-key item.

2. A method according to claim 1 wherein said classifying step further classifies non-key items which overlies a previously classified item when rendered to said page.

3. A method according to any one of claims 1 or 2 comprising the further step of:
    compressing said rendered image data of said at least one other non-key item.

4. A method according to claim 3 wherein said image data includes background image data and foreground image data, and said compressing step compresses said background image data to a greater extent than said foreground image data.

5. A method according to claim 1 wherein said image data includes background image data and foreground image data, comprising the further steps of:
    rendering said key item and said classified non-key item to said foreground image data; and
    compressing said rendered image data of said at least one other non-key item, wherein said compressing step compresses said background image data to a greater extent than said foreground image data.

6. A method according to claim 1 wherein at least one classified item is unable to be described in the compressed page description using page description commands, said method comprising the further step of:
    further rendering said at least one classified item to said image data, said image data forming part of said compressed page description.

7. A method according to claim 6, wherein said image data rendered from said at least one classified item includes background image data and foreground image data, and said background image data is compressed to a greater extent than said foreground image data.

8. A method according to claim 7, wherein said further rendering step renders said at least one classified item to foreground image data if said at least one classified item overlies a classified item.

9. A method according to claim 5 or claim 8, wherein when a particular item is rendered to background image data, said particular item either overlying or underlying another item to be rendered to foreground image data is also rendered to foreground image data.

10. A method according to claim 1 wherein said class of key items relate to text on a page.

11. A method according to claim 2 wherein said classifying step uses a counter for each non-key item to indicate how many key items or classified items each said non-key item overlies.

12. A method according to claim 11, wherein said classifying step classifies each said non-key item if the corresponding said counter is non-zero.

13. A computer apparatus comprising at least a processor coupled to a memory, the memory having recorded thereon an application executable by the at least one processor for generating a compressed page description from a list of items to be rendered to a page, at least one of said items belonging to a class of key items, wherein said application, when executed, causes the at least one processor to:
    classify one or more non-key items which would overlie at least one key item when rendered to said page by:
       estimating an increase in size of the compressed page description comprising the one or more non-key items if said one or more non-key items are described in compressed page description using page description commands;
       classifying said one or more non-key items described using said page description commands if said increase is less than a threshold;
    declassify a previously classified non-key item if said increase is greater than said threshold, wherein said previously classified non-key item is either:
       (i) underlying the classified non-key item; or
       (ii) underlying a previously declassified non-key item;
    render to image data at least one other non-key item; and
    generate said compressed page description, said compressed page description comprising:
       page description commands describing said at least one key item;
       page description commands describing said at least one classified non-key items; and
       said rendered image data of said at least one other non-key item.

14. A non-transitory computer program product having a computer readable storage medium having a computer program recorded thereon, the program being executable by computer apparatus for generating a compressed page description from a list of items to be rendered to a page, at least one of said items belonging to a class of key items, said computer program product comprising:

computer code means for classifying one or more non-key items which would overlie at least one key item when rendered to said page by:
  estimating an increase in size of the compressed page description comprising the one or more non-key items if said one or more non-key items are described in compressed page description using page description commands;
  classifying said one or more non-key items described using said page description commands if said increase is less than a threshold;
computer code means for declassifying a previously classified non-key item if said increase is greater than said threshold, wherein said previously classified non-key item is either:
  (i) underlying the classified non-key item; or
  (ii) underlying a previously declassified non-key item;
computer code means for rendering to image data at least one other non-key item; and
computer code means for generating said compressed page description, said compressed page description comprising:
  page description commands describing said at least one key item;
  page description commands describing said at least one classified non-key items; and
  said rendered image data of said at least one other non-key item.

* * * * *